United States Patent [19]

Schwartz

[11] Patent Number: 4,825,451
[45] Date of Patent: Apr. 25, 1989

[54] TECHNIQUE FOR TRANSMISSION OF VOICE COMMUNICATIONS AND APPARATUS USEFUL THEREIN

[75] Inventor: Nira Schwartz, Moshav Magshimim, Israel

[73] Assignee: Niravoice, Inc., Calif.

[21] Appl. No.: 602,152

[22] Filed: Apr. 19, 1984

Related U.S. Application Data

[63] Continuation-in-part of Ser. No. 404,423, Aug. 2, 1982, abandoned, and Ser. No. 484,268, Apr. 12, 1983, abandoned.

[30] Foreign Application Priority Data

Oct. 11, 1982 [IL]  Israel ........................................ 66952
Jul. 17, 1983 [IL]  Israel ........................................ 69251

[51] Int. Cl.$^4$ ......................... H04B 1/66; H04B 14/06
[52] U.S. Cl. ...................................... 375/27; 375/38; 375/122; 381/31
[58] Field of Search ................ 375/25, 27, 122, 38; 382/56; 370/8, 11, 79, 82, 83; 381/29, 31; 358/135, 138

[56] References Cited

U.S. PATENT DOCUMENTS

| | | | |
|---|---|---|---|
| 2,949,505 | 8/1960 | Kuetzmer | 375/25 |
| 3,278,729 | 10/1966 | Chien | 371/40 |
| 3,657,699 | 4/1972 | Rocher et al. | 178/22.19 |
| 3,706,842 | 12/1972 | Robertson | 370/11 |
| 3,723,879 | 3/1973 | Kaul et al. | 375/122 |
| 3,773,971 | 11/1973 | Sainte-Beuve | 370/83 |
| 3,976,844 | 8/1976 | Betz | 375/122 |
| 4,086,435 | 4/1978 | Graupe et al. | 179/1.5 R |
| 4,176,247 | 11/1979 | Englund | 178/22.19 |
| 4,179,710 | 12/1979 | Ishiguro | 375/27 |
| 4,237,552 | 12/1980 | Aikoh et al. | 370/118 |
| 4,369,463 | 1/1983 | Anastassiou | 382/56 |
| 4,387,455 | 6/1983 | Schwartz | 370/11 |
| 4,398,217 | 8/1983 | Peters | 382/56 |

FOREIGN PATENT DOCUMENTS

| | | |
|---|---|---|
| 2324201 | 11/1974 | Fed. Rep. of Germany . |
| 2036649 | 5/1975 | Fed. Rep. of Germany . |
| 2446690 | 9/1978 | Fed. Rep. of Germany . |
| 1518448 | 7/1978 | United Kingdom . |
| 2095517 | 9/1982 | United Kingdom . |

Primary Examiner—Benedict V. Safourek
Attorney, Agent, or Firm—Cushman, Darby & Cushman

[57] ABSTRACT

Apparatus for transmission of communications including apparatus for transmitting samples of an analog signal by conversion of such samples from their original frequencies to lower frequencies, extrapolating from the samples at the lower frequencies and reconverting the extrapolated samples to the original frequencies.

10 Claims, 2 Drawing Sheets

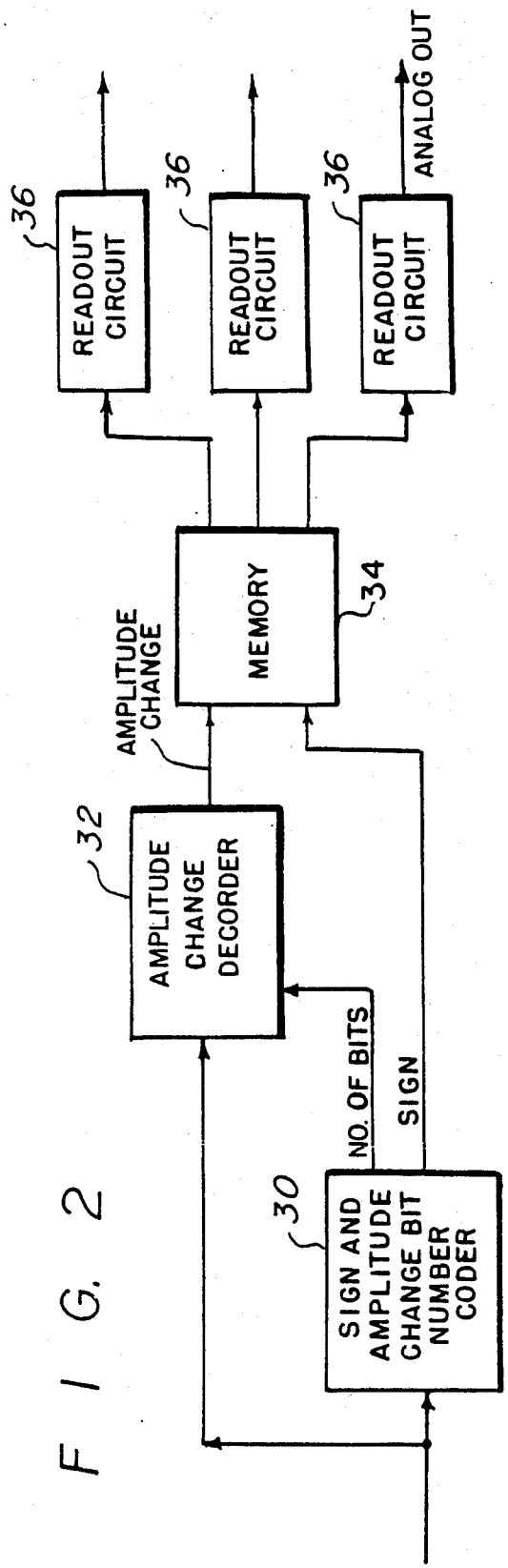

TECHNIQUE FOR TRANSMISSION OF VOICE COMMUNICATIONS AND APPARATUS USEFUL THEREIN

This application is a continuation-in-part of co-pending applications Ser. No. 484,268 filed Apr. 12, 1983, and Ser. No. 404,423 filed Aug. 2, 1982 (both now abandoned).

FIELD OF THE INVENTION

The present invention relates to communications techniques generally and more particularly to bit saving techniques for transmission of voice or data along a digital communications link and apparatus useful therein.

BACKGROUND OF THE INVENTION

It is well known to transmit a multiplicity of conversations along a single transmission link by digital techniques. This is achieved by periodic sampling of an analog signal, such as a voice signal, and transmitting the samples in digital form in place of the signals themselves. The Nyquist sampling theorem fixes the minimum sampling rate as twice the highest frequency of the signal being sampled.

One widely used technique for digital information transmission is PCM, i.e. pulse code modulation, whereby each sample is expressed in an 8 bit code. Various other types of coding for digital information transmission are also known and used. All of the conventional digital transmission techniques are characterized in that only a single sample relating to a single conversation is being transmitted at any one time. Therefore, using conventional technology, one can transmit 30 voice and 2 signalling channels over a single communications link.

There is described and claimed in applicant's pending Israel Patent Application No. 63117 an apparatus and method for transmission of information in digital form including apparatus for providing a plurality of signals coded into a multiplicity of digital code elements in accordance with a first modulation technique; and apparatus for providing a plurality of coded addresses for transmission, each of the coded addresses representing a digital code in accordance with a second modulation technique corresponding to a combination of code elements of individual ones of the plurality of signals.

The present invention seeks to provide a method and apparatus for transmission of voice signals which enables maximum benefit to be obtained from the technique of the aforesaid Israel Patent Application 63117. The technique and apparatus of the present invention is also applicable to transmission techniques other than that described in the aforesaid Israel Patent Application 63117.

SUMMARY OF THE INVENTION

The present invention seeks to provide a technique for transmission of voice communications which greatly enhances the efficiency of such transmission and enables a significantly greater number of conversations to be transmitted over the same number of transmission channels than heretofore.

There is thus provided in accordance with an embodiment of the present invention a technique for transmission of analog communications comprising the steps of sampling an analog signal to be transmitted at a given sampling rate, storing the sampled amplitude at a time t, thereafter at times T+n t transmitting only the change in amplitude A, while updating the stored amplitude accordingly.

Additionally in accordance with an embodiment of the present invention, a plurality of analog signals are sampled, their respective amplitudes are stored, and the changes in their amplitudes at subsequent sampling times are transmitted.

Additionally in accordance with a preferred embodiment of the present invention, the change in amplitude of one or more analog signals is transmitted by transmitting a first code indicating whether or not there is an amplitude change and what its sense is, i.e., positive or negative, and indicating the number of bits to be used to define the amplitude change and a second code of bit content which varies corresponding to the size of the amplitude change of the amplitude signal.

Further in accordance with a preferred embodiment of the present invention, a plurality of analog signals may be transmitted simultaneously by constructing the first code to indicate the sign change sense, presence of amplitude change and number of bits used to define it for the plurality of signals and by constructing the second code to contain the definition of the amplitude change for each of the plurality of signals.

The present invention is predicated on an appreciation that particularly in voice communications, most of the energy, i.e. voice activity is in the frequency range of approximately 100–600 Hz. Thus with a sampling rate of 8000 Hz, which is conventional in digital communications it is seen that most of the amplitude changes are sufficiently small so as to be definable by much less than the conventional 8-bit 256 level conventional full bit stream definition.

It has been appreciated by applicant that due to the physical structure of the human vocal cords, the frequency makeup of human speech always remains constant for at least 20 milliseconds, which represents 160 samples at a sampling rate of 8 KHz. Therefore, it is considered reasonable by applicant to assume constancy of the speech waveform over a number of samples, such as 5 or 10 samples.

BRIEF DESCRIPTION OF THE DRAWINGS

The present invention will be more fully understood and appreciated from the following detailed description taken in conjunction with the drawings in which:

FIG. 2 is a block diagram illustration of receiving apparatus constructed and operative in accordance with an embodiment of the present invention and operative in conjunction with the apparatus of FIG. 1 and FIG. 3 is a code diagram useful in the invention.

DETAILED DESCRIPTION OF THE INVENTION

Figure 1:
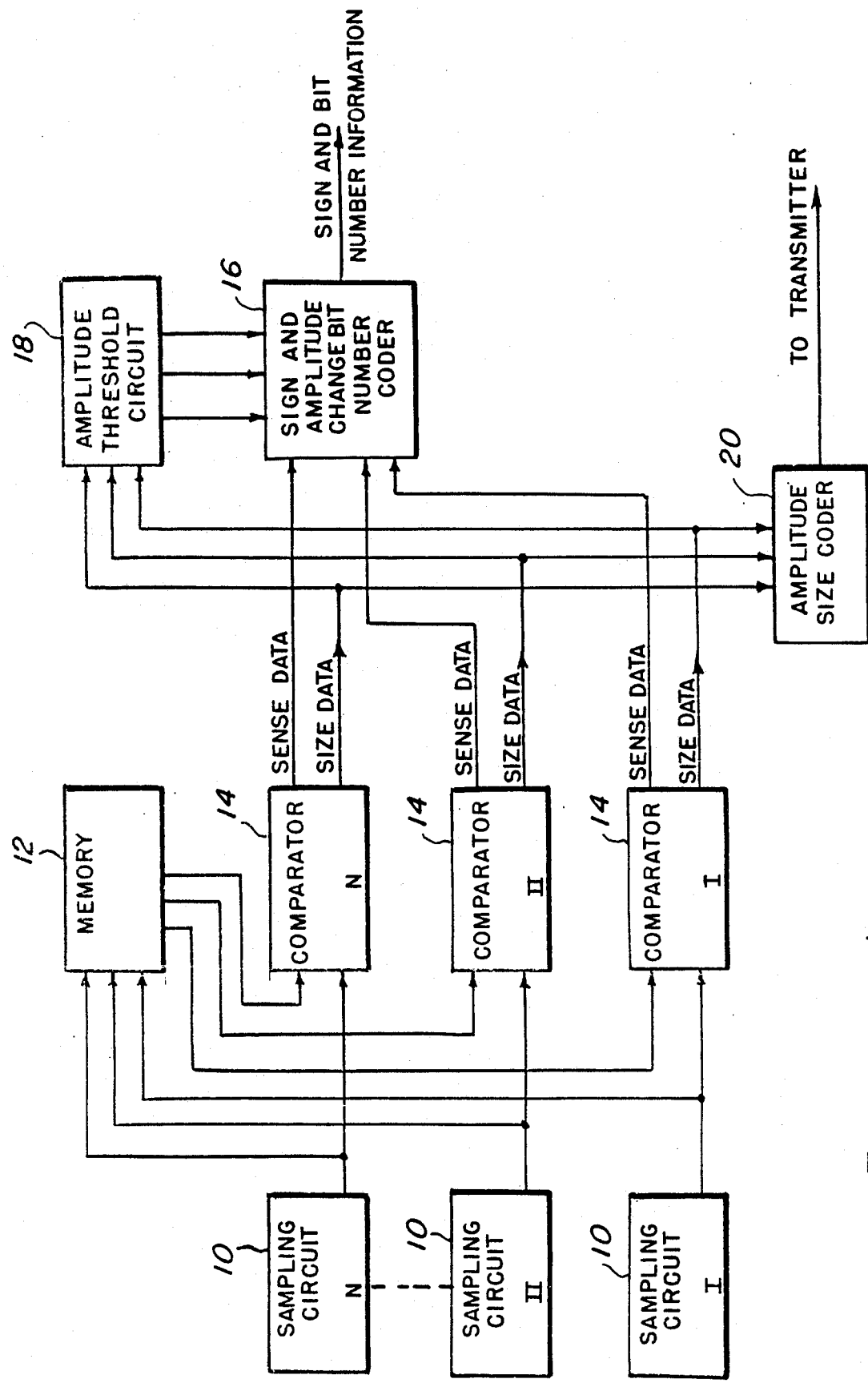
FIG. 1 is a block diagram illustration of transmission apparatus constructed and operative in accordance with an embodiment of the present invention.

The present invention provides a technique for efficient transmission of analog signals such as voice signals in digital form, whereby a greater number of such signals may be transmitted over a given transmission link than was previously possible using prior art techniques.

The present invention is predicted on the appreciation that in voice communication, most of the activity, i.e. the voice energy is transmitted within a wavelength range of between approximately 100 and 600 Hz. In mathematical terms one can say that if one expresses normal voice analog signals in a fourier series $A_n \sin nt + B_n \cos nt$, the integrals of $A_n$ and $B_n$ over frequencies over the range of approximately 80% of the value of the integrals over all frequencies.

If one employs a conventional sampling rate of 8000 Hz, it may be appreciated that except for very sharp amplitude changes which are quite rare, most amplitude changes between adjacent samples are sufficiently small as to be definable to a desired level of accuracy in much less than the 8 bits normally used for a full scale 256 level definition of the signal. Therefore, in most cases, it is possible to use less than 8 bits to fully define the signal. In accordance with the invention, significant bit efficiency and savings in bit transmission may be realised by classifying the amplitude change as to its general characteristics and then transmitting a relatively short bit stream further defining the amplitude change.

Reference is now made to FIG. 1 which is a block diagram illustration of apparatus for transmission of a plurality of analog signals in digital form constructed and operative in accordance with a preferred embodiment of the present invention.

The apparatus of FIG. 1 comprises a plurality of amplitude sampling circuits 10 each of which samples a different analog signal at a predetermined sampling rate, typically 8000 Hz. It is appreciated that any desired number of sampling circuits 10 may be employed. The present illustration is limited to three such circuits for the purpose of simplicity and conciseness of description throughout. The outputs of each of the sampling circuits 10 are supplied to a memory 12, which is operative to store the current amplitude level of each analog signal. The outputs of each of the sampling circuits 10 are also supplied to a plurality of corresponding comparators 14, each of which also receives an input from memory 12 indicating the preceding analog signal level. Comparators 14 are operative to provide two outputs, indicating respectively, the sense of the change in amplitude of the sampled analog signal from the previous sample and the size of this change.

The sense of the amplitude change indicates whether the change is positive or negative. This output is supplied to sign and amplitude change bit number coding circuitry 16 which will be described hereinbelow. The outputs from comparators 14 which indicate the size of the amplitude change are supplied in parallel to amplitude threshold circuitry 18 and to amplitude size coding circuitry 20.

The amplitude threshold circuitry 18 is operative to classify the size of the amplitude change into a number of predetermined groups which may be described adequately by different numbers of bits. Circuitry 18 is operative to provide an output to the sign and amplitude change bit number coding circuitry 16 and to circuitry 20 which indicates in which of a number of predetermined classifications, the amplitude change of the sampled analog signals fall.

Circuitry 16 is operative to provide a coded output indicating both the sign and the maximum number of bits required for description of the size of the amplitude changes in the sampled analog signals. The output of circuitry 16 is supplied to a transmitter together with the output of circuitry 20, which is a bit stream of a varying number of bits which describes the size of the amplitude change for each of the sampled analog signals.

The outputs of circuitry 16 and of circuitry 20 may be transmitted by any desired technique. According to a preferred embodiment of the present invention, the outputs of circuitry 16 and of circuitry 20 each may be transmitted, in a time shared technique by a different modulation technique over the same frequency band. Thus for example, the output of circuitry 16 may be transmitted by PCM, while the output of circuitry 20 may be transmitted by PWM. Alternatively AM, FM or any other desired type of modulation may be employed. This technique is described and claimed in applicant's earlier filed Israel Patent Application No. 63117.

The operation of circuitry 16 will now be explained with reference to FIG. 3, which is a table indicating a typical type of coding useful in the operation of the invention. It is appreciated that other types of coding may alternatively be employed.

For example, a set of five groups may be defined to define a change in sign status:

| GROUP | DESCRIPTION |
| --- | --- |
| I | NO SIGN CHANGE IN ANY OF THE THREE SIGNALS |
| II | SIGN CHANGE IN FIRST SIGNAL ONLY |
| III | SIGN CHANGE IN SECOND SIGNAL ONLY |
| IV | SIGN CHANGE IN THIRD SIGNAL ONLY |
| V | SIGN CHANGE IN MORE THAN ONE SIGNAL |

For the sake of clarity it is noted that the sign changes being considered are the change in sign of the amplitude change as compared with the amplitude change noted in the previous sample.

It is also noted that notwithstanding that group V contains many more permutations than the other groups I-IV, which are single permutation groups, group V has a probability of occurrence which is lower than the remaining groups.

The output from circuitry 18 provides an output indication indicating a classification of the overall size of the amplitude change as follows:

| CLASSI-FICATION | DESCRIPTION |
| --- | --- |
| A | AMPLITUDE CHANGE CAN BE DESCRIBED BY 2 BITS PER SIGNAL |
| B | AMPLITUDE CHANGE CAN BE DESCRIBED BY 3 BITS PER SIGNAL |
| C | AMPLITUDE CHANGE CAN BE DESCRIBED BY 4 BITS PER SIGNAL |

FIG. 3 illustrates the permutations arising from the combination of the five groups I-V and the three classifications. It is seen that 15 permutations, numbered 1-15 result. A sixteenth permutation indicates that the amplitude change is of amplitude so great that it cannot be described by four bits.

It follows that the output of circuitry 16 is a four-bit output indicating which of the 16 permutations of classification are employed. The output of circuitry 16 indicates to a receiver, the number of bits that will be used to describe the amplitude change for each of the signals. As noted above, for the permutations 1-5, 2 bits will be used for each of the signals, for the permutations 6-10, 3 bits will be used for each of the signals and for the permutations 11-15, 4 bits will be used for each of the signals.

It is further noted that for the permutation 16, a greater number of bits may be used as desired. For the permutations of classification V, i.e. permutations 5, 10 and 15, an additional two bits are added to fully specify the sign change.

It is a particular feature of the present invention that the occurance of permutations is highly weighted in favor of groups I-IV and in favor of classification A. On the basis of the information available to the applicant, the probability of occurance for the various permutations is as follows:

| PERMUTATION NOS. | PROBABILITY |
|---|---|
| 1, 2, 3, 4 | 95% |
| 6, 7, 8, 9 | |
| 11, 12, 13, 14 | |
| 5, 10, 15 | 4% |
| 16 | 1% |

According to an alternative embodiment of the present invention, absolute amplitudes may be transmitted instead of amplitude changes. It is also appreciated that digital signals may also be sampled and transmitted in accordance with the present invention by suitable techniques corresponding to the techniques described hereinabove.

Reference is now made to FIG. 2 which is a block diagram illustration of receiving circuitry constructed and operative in accordance with an embodiment of the present invention and designed to work together with the transmitting circuitry of FIG. 1.

Digital signals received over a transmission link from a transmitter are supplied in parallel to a sign and amplitude change bit number decoder 30 and to an amplitude change decoder 32. Decoder 30 is operative to provide an output indicating the sign of the amplitude change for each signal to a memory 34 and is also operative to provide an output indication of the number of bits used to describe the amplitude change. This output indication is supplied to the amplitude change decoder, enabling it to determine which bits in a continuous bit stream represent the size of the amplitude change for each of the signals. The amplitude change decoder 32 provides an output to memory 34 indicating the amplitude change for each of the signals.

Memory 34 is operative to store the current amplitude for each of the channels. The contents of the memory are read out as desired by read out circuits 36 corresponding to each analog signal which are operative to reconstruct the analog signals to a desired level of accuracy.

It may be appreciated by persons skilled in the art that significant bit savings are provided by the apparatus and technique of the present invention. If one compares the operation of the present invention with conventional transmission techniques wherein 8 bits are employed to describe each sample, one notes the number of bits required and the bit savings as follows:

| PERMUTATION | BITS REQUIRED | BITS SAVED |
|---|---|---|
| 1 | 10 | 14 |
| 2 | 10 | 14 |
| 3 | 10 | 14 |
| 4 | 10 | 14 |
| 5 | 12 | 12 |
| 6 | 13 | 11 |
| 7 | 13 | 11 |
| 8 | 13 | 11 |
| 9 | 13 | 11 |
| 10 | 15 | 9 |
| 11 | 16 | 8 |
| 12 | 16 | 8 |
| 13 | 16 | 8 |
| 14 | 16 | 8 |
| 15 | 18 | 6 |
| 16 | up to 24 | down to 0 |

Further taking into account the occurance probabilities set forth hereinabove, it may be appreciated that using the code configuration indicated, savings of between 40 and 50% in bit transmission may be obtained with very little information loss.

It is further appreciated that any other type of code or organization configuration may be used in accordance with the present invention. A greater or lesser amount of signals may be handled by the apparatus. The coding may employ a greater or lesser number of groups or combinations so as to obtain maximum bit savings. Thus, for example, a larger number of groups may be employed so as to enable a specific group to be assigned for indicating the number of bits to be used for each individual signal, instead of for each group of signals. That is, instead of assigning a classification A to permutations where an amplitude change can be described by 2 bits per signal, one can instead assign classifications as follows:

| CLASSIFICATION | DESCRIPTION |
|---|---|
| A 1 | AMPLITUDE CHANGE FOR FIRST SIGNAL CAN BE DESCRIBED BY 2 BITS |
| A 2 | AMPLITUDE CHANGE FOR SECOND SIGNAL CAN BE DESCRIBED BY 2 BITS |
| A 3 | AMPLITUDE CHANGE FOR THIRD SIGNAL CAN BE DESCRIBED BY 2 BITS |

A similar definition can be done for the remaining classification.

The foregoing is one of many possible examples of redefinition of the coding format according to the invention for obtaining maximized bit efficiency. The present invention is not limited to any code or organizational format.

It will be appreciated by persons skilled in the art that the present invention is not limited to what has been particularly shown and described hereinabove. Rather, the scope of the present invention is defined only by the claims which follow:

I claim:

1. A bit-saving method for transmission of digital communications comprising the steps of:
periodically sampling at least one signal to form digital samples which include information;
generating a derivative of said information which is functionally dependent upon a relationship among successive samples and transmitting a first message indicating a number of bits necessary to be used to define said derivative of said information of said at least one signal; and
transmitting a second message defining an amplitude relating to the sampled at least one signal, said second message having a variable number of bits as indicated by said first message.

2. A method according to claim 1 wherein said at least one signal comprises at least one analog signal.

3. A method according to claim 1 further comprising the steps of storing the sampled amplitude of said at least one signal at time T;

and updating the stored amplitude in accordance with the changes in amplitude transmitted by said first and second messages.

4. A method according to claim 1 and wherein said first and second messages are transmitted by respective first and second modulation techniques which differ from each other.

5. An apparatus for preparing a signal for transmission, comprising:

amplitude sampling means for sampling the amplitude of at least one analog signal;

memory means for storing the current value of the amplitude of said at least one analog signal;

comparator means receiving inputs from said sampling means and from said memory means for providing an output indication of the change in the amplitude of said at least one analog signal;

first coding means, coupled to an output of said comparator means, for providing a first coded message indicating a sign and number of bits required to define the amplitude change of said at least one analog signal; and second coding means, coupled to an output of said comparator means and said first coding means, for providing a second message indicating a size of the amplitude change for said at least one analog signal, said second coded message having a number of bits, defined by said first coding message.

6. Apparatus for receiving analog communications transmitted in the form of a first coded message indicating the sign and number of bits required to define the amplitude change for at least one analog signal and a second coded message indicating the size of the amplitude change, said apparatus including:

first decoding means for decoding said first coded message to provide an output indicating the sign of the amplitude change and the number of bits used to define the amplitude change;

second decoding means coupling to an output from said first decoding means indicating the number of bits used to define the amplitude change, to provide an output indicating the size of the amplitude change of at least one analog signal in accordance with said output of said first decoding means;

memory means coupled to the outputs of said first and second decoding means for storing a current representation of said at least one analog signal; and read out means for reading out from said memory said at least one analog signal.

7. A bit-saving method of transmitting and receiving amplitude changes in an analog voice signal communicated over a digital communications network, said method comprising the steps of:

A. periodically sampling said analog voice signal according to an n-bit code, where n is an integer, thereby to generate sequential digital samples of respective quantization levels, B. detecting a change in amplitude of successive sequential digital samples of said analog voice signal, said change in amplitude being represented by a variable-length bit stream, C. generating a first code representative of the sense of said change of amplitude, said sense being representative of positive, negative or zero, D. generating a second code representative of the magnitude of the said change in amplitude, which second code corresponds to the bit length of said variable-length bit stream, E. transmitting said variable-length bit stream, said first code, and said second code to a receiver, and F. reconstructing changes in said analog voice signal at said receiver according to said variable-length bit stream, said first code, and said second code.

8. A bit-saving method as recited in claim 7 wherein the reconstructing step comprises:

G. segmenting the variable-length bit stream from said first and second codes,

H. interpreting said variable-length bit stream according to said first and second codes and, I. converting said interpreted bit stream to an analog signal representative of the amplitude change in said voice signal.

9. An apparatus for compressing digital data representations of an analog voice signal transmitted in a digital communications system by transmitting the change in amplitude of said analog signal, said apparatus comprising:

A. sampling means (10) for periodically sampling said analog voice signal according to an n-bit code thereby to generate sequential digital samples of respective quantization levels, B. detecting means for detecting a change in amplitdue of successive sequential digital samples, said change in amplitude being represented by a variable-length bit stream, C. means for generating a first code representative of sense of said change of amplitude as being positive, negative or zero, D. means responsive to said detecting means for generating a second code representative of the bit-length of the said change in amplitude, said second code corresponding to the length of said variable-length bit stream, E. transmitting means for transmitting said first code, and said second code and said variable-length bit-stream to a receiver, and F. reconstructing means (30-36) for reconstructing amplitude changes in said analog voice signal at said receiver according to said variable-length bit stream, said first code and said second code.

10. An apparatus as recited in claim 9 wherein said reconstructing means further comprises:

G. segmenting means (30, 32) for segmenting the variable-length bit stream from said first and second codes, H. interpreting means (34) for interpreting said variable-length bit stream according to said first and second codes and, I. converting means (36) for converting said interpreted bit stream to an analog signal representations of changes in said voice signal.

* * * * *